United States Patent [19]
Koren

[11] Patent Number: 5,548,408
[45] Date of Patent: Aug. 20, 1996

[54] IMAGE PROCESSING SYSTEM

[76] Inventor: Doron Koren, 26 Habanim St., Kfar Sirkin, Israel, 49935

[21] Appl. No.: 184,045

[22] Filed: Jan. 21, 1994

[30]     Foreign Application Priority Data

Jan. 27, 1993 [IL] Israel ......................................... 104529

[51] Int. Cl.6 .................................................... H04N 1/23
[52] U.S. Cl. ............................................ 358/300; 358/302
[58] Field of Search .................................. 358/300, 302, 358/472; 355/47, 48, 22, 49

[56]                 References Cited
              U.S. PATENT DOCUMENTS

| | | | |
|---|---|---|---|
| 3,657,707 | 4/1972 | McFarland et al. | 340/173 |
| 3,692,405 | 9/1972 | Blachut et al. | 355/22 |
| 3,694,072 | 9/1972 | Danko, Jr. et al. | 355/22 |
| 4,056,316 | 11/1977 | Zutrauen | 355/22 |
| 4,060,321 | 11/1977 | Butement | 355/8 |
| 4,304,842 | 12/1981 | Schoute | 355/47 |
| 4,366,509 | 12/1982 | Norrel et al. | 358/289 |
| 4,400,080 | 8/1983 | Ogawa et al. | 355/49 |
| 4,635,130 | 1/1987 | Oi | 358/296 |
| 4,899,222 | 2/1990 | Price | 358/302 |
| 4,935,774 | 6/1990 | Ageishi et al. | 355/49 |
| 5,103,316 | 4/1992 | Ogura | 358/302 |

*Primary Examiner*—Peter S. Wong
*Assistant Examiner*—K. Shin
*Attorney, Agent, or Firm*—Norman B. Rainer

[57]                ABSTRACT

An image processing system has at least one rotatable drum which has an optical memory on its outer surface constituting an active write/read memory of a raster image processor for a digital image written thereon. The optical memory modulates light illuminating the optical memory from a light source for imaging the image from the optical surface onto a photographic material.

20 Claims, 6 Drawing Sheets

IMAGE PROCESSING SYSTEM

FIELD OF THE INVENTION

The invention relates to image processing systems in general and, in particular, to an improved image processing device for modulating large area light sources for use in these systems.

BACKGROUND OF THE INVENTION

Image processing systems today process images in several stages. The most common way to process an image for later exposing it, is to save it in vector form, such as Gerber or Postscrit language, in a computer memory. This form permits one to save large images in a relatively small area of memory. In the process, the vector file is converted by a Raster Image Processor (RIP) into a bit map or run-length (RL) which represents the image. Each run-length is composed of two numbers, the first representing where a line starts, and the second, where the line ends. This is a convenient method for saving images on a medium sized memory. Usually the memory contains three dimensions, X, Y and Z, the Z dimension being a buffer, called the Z-buffer.

The RL is processed to an image by an apparatus which converts it to light to expose photosensitive material. In the process, a light modulator activates a laser light beam in accordance with the bit map to illuminate or not illuminate each pixel, one after the other.

Currently, there are three main methods for exposing and printing a saved image which are known in the art:

1) An internal drum system (such as is described in U.S. Pat. No. 4,853,709 to Stein et al) which is based on a stationary cylindrical surface to whose internal side is attached photosensitive material, and which uses a rotating prism to scan an image in order to recreate it on the photosensitve material;

2) An external drum system (as in U.S. Pat. No. 4,577,933 to Yip et al) in which the photosensitive material is attached by vacuum to the external side of a rotating drum, and in which a carriage moves along the drum axis and contains a writing head which creates the image from a modulator external to the drum; and 3) A flatbed system (as in U.S. Pat. No. 4,354,196 to Neumann et al) in which the photosensitive material is attached to a flat table bed which moves slowly along the X axis while a revolving multi - mirror polygon or prism scans the image in the Y axis.

In all of these systems the image is processed by modulating beams of light from a high brightness light source such as a laser diode or gas laser in order to expose the material pixel by pixel. The laser is modulated by means of a stationary light modulator which can be, for example an acousto - optical device such as is described in the aforementioned U.S. Pat. No. 4,577,933, a multi beam imager such as is described in U.S. Pat. No. 4,506,275 to Maeda or an integrated electronics device such as described in U.S. Pat. No. 4,367,925 to Sprague et al.

In all of the above modulators, the throughput is very low (several minutes for an 18"×24" image) because of the limited number of actual writing beams. Furthermore, these systems cannot use large area light sources due to the low brightness obtained, which is insufficient for exposing individual pixels.

U.S. Pat. No. 5,049,901 to Gelbart describes a light modulator capable of using large area light sources, comprising a two dimensional deformable mirror modulator and moving photosensitive material. The modulator consists of a number of rows—preferably about 100—with about 1000 mirrors per row. The information to be imaged is entered into the first row and then transferred, row by row, to subsequent rows in a direction and rate such that the imaged data supposedly is kept stationary relative to the moving photosensitive material.

This patent suffers from several disadvantages:

1. The actual writing time for the whole image depends on the propagation delay time and the rise time of the electrical deformable mirror. For example: if the writing time for one row is 1 uSec, then for 100 rows the writing time will be 0.1 milli-second. The device has to rewrite all of the data for each row in turn. Therefore, the write time for an image containing 10,000,000,000 pixels ($10^{10}$ which is a typical number of image-pixels in the art, for a 31"×40" image at 8000 dpi) will be very long.

2. The deformable mirror device currently available is relatively small (100×1000 cells). Therefore, in order to increase the throughput, the system must contain several devices which will in all probability decrease the system's accuracy, repeatability and reliability.

3. The data moves sequentially from row to row in discrete quantities (i.e. from cell to cell), while the photosensitive material obviously moves continuously. This method causes the image's pixels to blur. The intensity pattern on the photosensititve material will be the convolution between the discrete data rate and the continuous velocity of the photosensitive material. As a result of the above, the actual pixel size will be almost double the original imaged pixel. The fact that the deformable mirror can change the data only one row at a time, increases that phenomenon.

Another disadvantage of all the above prior art systems is that the conversion from a vector file to an image is done by a separate computer. Therefore these systems are very expensive, require high-power computers and use highly complex algorithms. Moreover, all these systems use conventional memory to save the image in the computer (Static RAM or Dynamic RAM chips) and transfer the bits to an electronically controlled light modulator when exposing the photosensitive material. This results in a trade-off between the resolution and the imaging time (or throughput), because of the limited rate at which the data can be transferred in those devices.

There are also known rotating prism cameras, such as described in Soviet Patents numbers 1277055 and 1290240. In these cameras, the photosensitive material moves in a continuous manner while a rotating prism shifts the exposing image in synchrony with the photosensitive material. The prism does not modulate the image, but only transfers an image from a lens. There is no optical memory involved.

SUMMARY OF THE INVENTION

It is an object of the present invention to provide an image processing system having a high throughput, using large area light sources.

It is another object of this invention to provide an image processing system which can be used with low brightness light sources and wherein imaging is accurate, repeatable and reliable.

Thus, according to the present invention, there is provided an image processing device including a rotatable drum defining an optical memory on its outer surface, the optical memory being arranged to record a bit map image written thereon, the drum being arranged for modulation of light from a large area light source during processing of the image.

Further according to the invention there is provided an image processing system including a computer serving as a system controller, at least one light-modulating rotatable drum defining an optical memory, at least one read/write head coupled to the computer for receiving data therefrom and arranged to write received data on the optical memory, a large area light source arranged to illuminate the drum, a holder for photosensitive material arranged for synchronous movement with the drum, apparatus for exposing photosensitive material in the holder to the image on the rotatable drum, and apparatus for synchronizing the movement of the photosensitive material with the movement of the rotating drum.

There is further provided an image processing system in which an image is processed in two stages:

1) a bit map corresponding to the image is written on the optical memory of the drum;

2) photosensitive material is exposed to the image from the drum, synchronously with rotation of the drum, relatively large areas of the material being exposed at one time.

BRIEF DESCRIPTION OF THE DRAWINGS

These and other objects of the invention will become apparent in the following description taken in connection with the drawings, in which.

DETAILED DESCRIPTION OF THE INVENTION

The present invention relates to image processing apparatus and to novel modulating means for use therein. This invention seeks to overcome the disadvantages of light modulators and image processing systems described above by using an optical memory on a rortatable drum. The invention uses the drum as part of the RIP (Raster to image processor) by using the drum as its active memory. Since the memory is optical, the drum also serves as the light modulator during exposure of photosensitive material, and a large area light source can be used while retaining a high throughput. In this way, the system can use a low brightness light source because of the large area of imaging.

Figure 1:
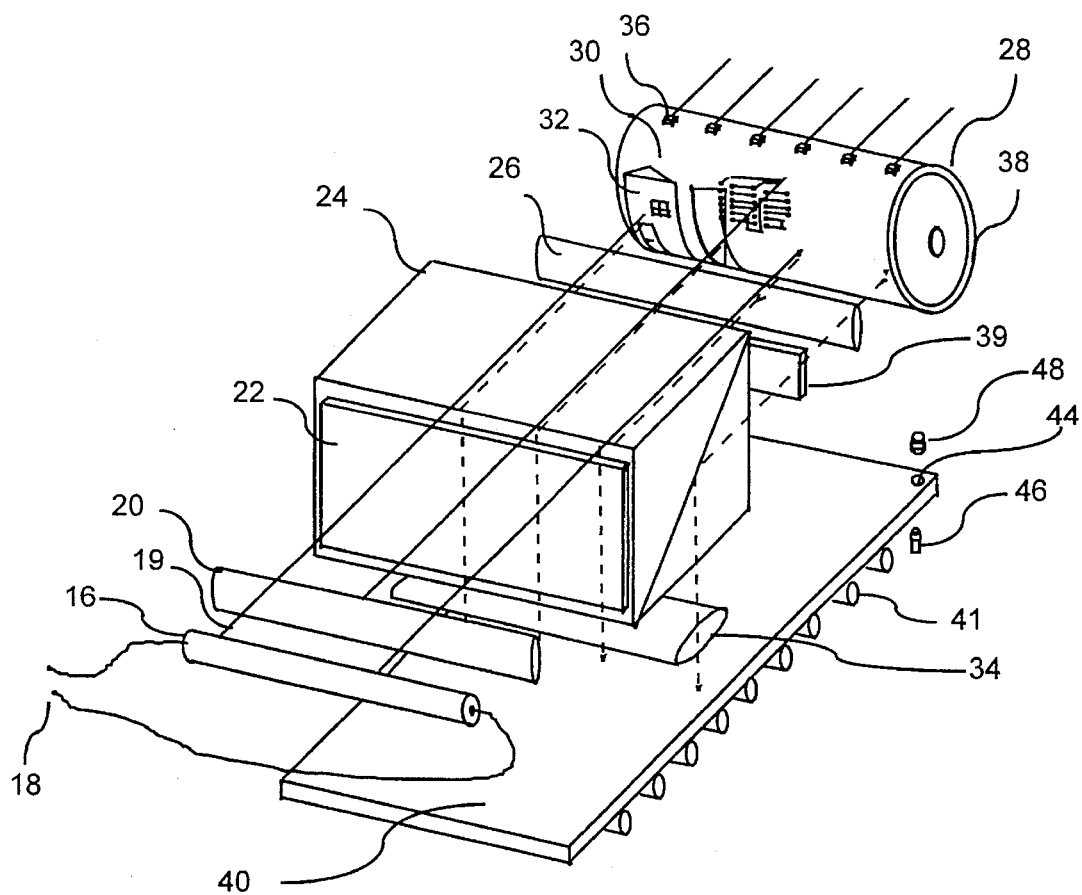
FIG. 1 is a schematic illustration of an image processing system according to the present invention.
Figure 2:
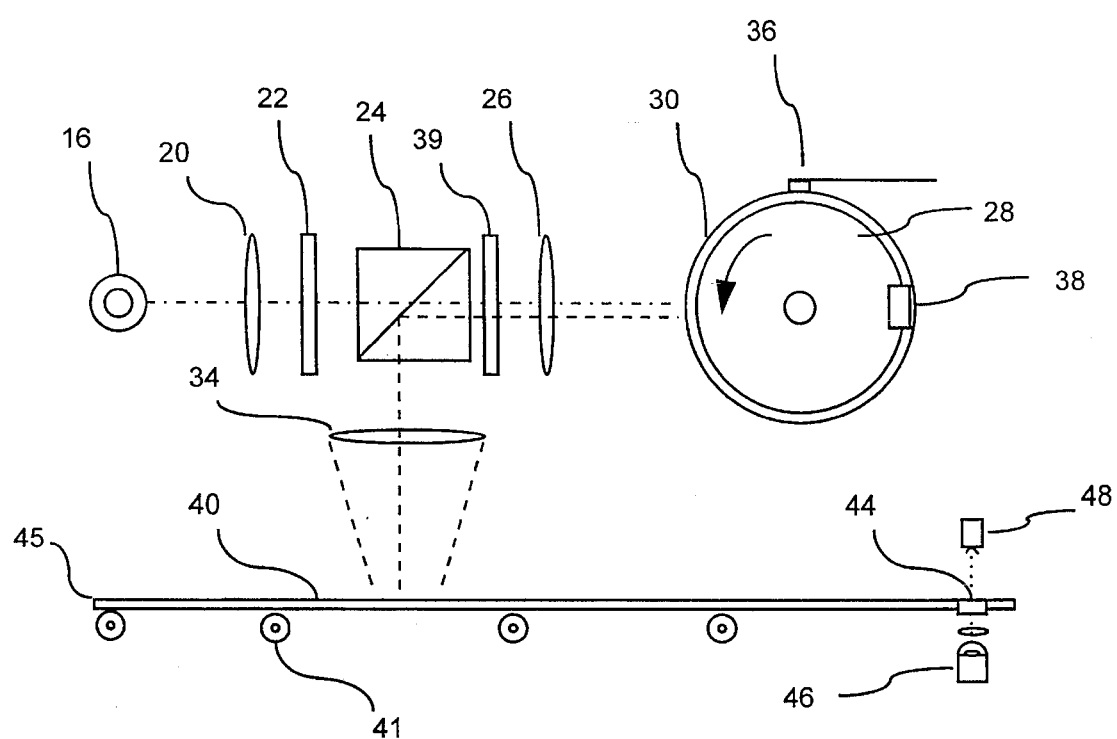
FIG. 2 is a side yew of the embodiment of FIG. 1.

Referring now to FIGS. 1 and 2, there is shown an image processing system constructed and operative in accordance with one embodiment of the present invention and comprising a drum 28. The outer surface of drum 28 comprises an optical memory 30, i.e., material on which an optically-readable image can be written. Optical memory 30 may comprise a magneto-optical coating 30 or another type of coating, such as an electro-optical coating or liquid crystal (LCD), or any other optical memory, as long as an optically readable image can be created and recorded thereon.

The vector file image is converted into a bit map or run-length magnetic image. The bit map is transferred to a magnetic writing head 36 for writing onto optical memory 30 while the drum rotates. An angular encoder 38 is attached to the drum in order to create an addressable memory.

Figure 3:
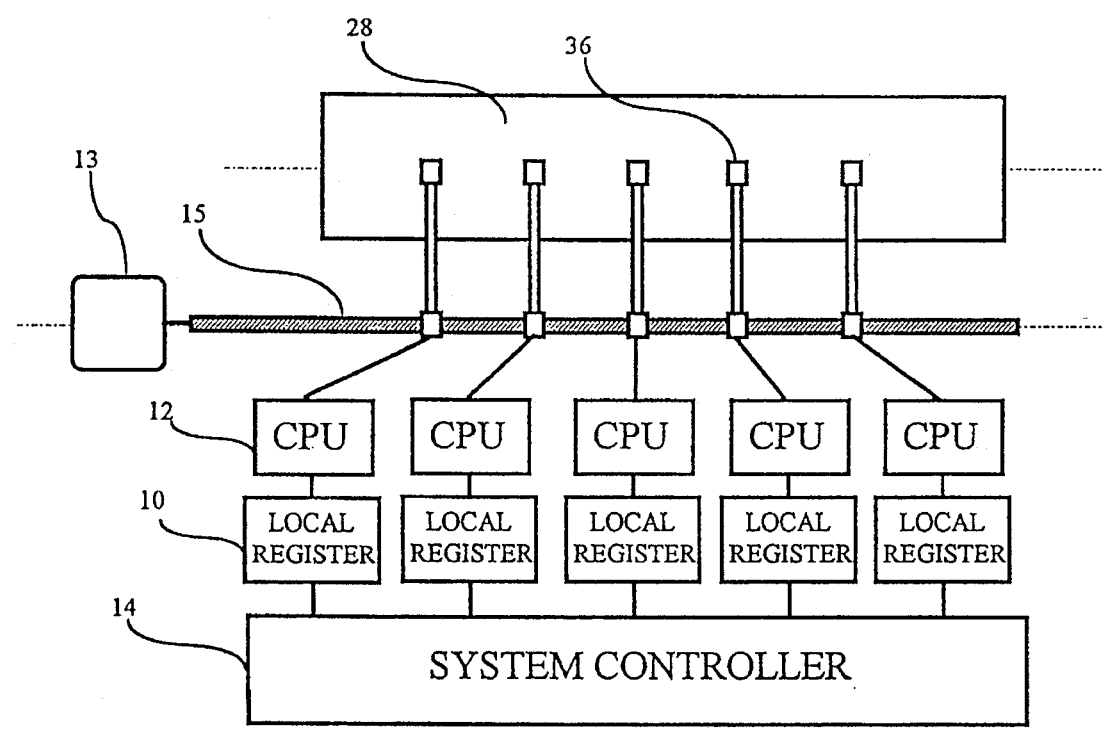
FIG. 3 is a schematic illustration of one portion of the image processing system of the invention.

According to a preferred embodiment, shown in FIG. 3, a plurality of writing heads 36 are provided to reduce the writing time. Each head 36 is coupled to a low-power CPU 12 for writing or reading a portion of the image on the drum. A system controller 14 divides the image into portions, either by area or by amount of work. Controller 14 is coupled to each CPU 12 and provides thereto the writing instructions for the associated writing head. This embodiment is convenient for parallel computing with shared resources. It will be appreciated that the larger the number of CPU's and writing heads, the faster will be the throughput. Since these CPU's are small and inexpensive, a relatively large number can be used for increased efficiency of the image processing system.

In the illustrated embodiment, heads 36 are coupled to a rotatable screw 15 rotated by a motor 13 for longitudinal displacement along the axis of drum 28. In this case, all of heads 36 move together in the direction of the drum axis. According to an alternate embodiment, heads 36 can be attached to different moving mechanisms or can be arranged at different heights from one another, to provide individual movement for each head.

According to one embodiment, the writing head is a magnetic head similar to the magnetic head which is used in magnetic recording media such as magnetic discs, optical discs, floptycal discs or others. In case of LCD memory, the writing head can be an optical head or other similar heads.

Since the writing head is also a reading head, heads 36 optionally can be arranged to scan the drum to verify that the image has been properly recorded in the optical memory. This eliminates the need for a conventional Z-buffer. Furthermore, since the drum itself is the active memory onto which the bit map is written, no big active memory is required in the computer which drives the system.

It is a particular feature of the invention that drum 28 is a part of the Raster Image Processor of the invention. The drum serves as the active memory, replacing the computer memory in conventional systems. Since writing on the drum memory and writing in the computer memory require about the same time, there is no loss of time in the present system. On the contrary, since there is no limited line required for transfer of the data from the computer memory to the imaging device during exposure of the photosensitive material in the present invention, the overall system is substantially faster than conventional systems.

In the second stage of image processing, photosensitive material is exposed to the image on drum 28. It will be appreciated that photosensitive material, as used herein, can refer to film, a photopolymer, xerographic drum or any other desired material onto which an image can be exposed by light.

Referring again to FIGS. 1 and 2, a large area light source 16, here illustrated as a linear lamp, is provided which can be of a high brightness type or, preferably, of a low brightness type such as an arc, incandescent or UV lamp. Light from light source 16 illuminates a portion 32 of the image on the drum memory. The impinging light is reflected by memory 30 and, via suitable optics, exposes photosensitive material 40 which is mounted on a holder of any suitable kind. The material holder is arranged to move synchronously with drum 28 such that the image is transferred continuously from the drum to the photosensitive material.

According to the illustrated embodiment, the optics include means for polarizing the impinging light. Light beams, indicated by arrows 19, pass through a lens 20, a polarizer 22 and a polarizing beam splitter (PBS) 24. The polarized light beams which emerge from the PBS then pass through a retardation plate 39 and an objective lens 26, and impinge on the surface of a drum 28.

The impinging light is reflected from the optical memory 30 and, wherever the polarized light impinges on a magnetized pixel, the plane of polarization of the reflected light is rotated. The reflected light passes once more through the objective lens 26 and the retardation plate 39 and reaches the PBS 24. Light beams whose polarization has been rotated cannot pass through the PBS and are deflected 90 degrees downwards through a and a focusing lens 34, onto photosensitive material 40. It will be appreciated that any other imaging optics from the drum to the photosensitive material can be used instead of the illustrated optics.

It is a particular feature of the invention that a relatively large area is illuminated and exposed at one time. In contrast to conventional systems wherein a single pixel or, at most, a single row of pixels is exposed at any given time, in this invention, an area composed of a large number of pixels (which can even include fractions of pixels) is illuminated and exposed at a time, thereby providing exposure at a much faster rate than in conventional systems. This is possible due to the use of the optical memory on the drum for image storage prior to exposure, and to the use of a large area light source (as opposed to a laser light source) for exposure of the photosensitive material. It is not necessary that the light source provide coherent light. Rather, the wavelength chosen need only be suitable for the particular photosensitive material being exposed and the type of optical memory on the drum.

During exposure, the rotation rate of the drum is determined by the optical energy which the particular photosensitive material requires. The optical image moves precisely and continuously in synchrony with the velocity of the photosensitive material, as a result of which the pixels do not blur. At the same time, throughput is maximized. According to the invention, drum 28 serves as the light modulator in the imaging system during the exposing stage. In this way, the image processing system contains fewer components and works substantially faster than conventional systems wherein data is transferred over a limited rate line or modulator.

According to the illustrated embodiment, the photosensitive material 40 is attached by vacuum to a moving flat bed table 45 which rests on rollers 41. The table 45 moves in a direction perpendicular to the axis of the drum 28, carrying the photosensitive material with it. The movement of the table is synchronized with the rotation of the drum in any conventional manner. In the illustration, a light source 46 located under the table sends a light beam through a registration hole 44 to a detector 48 which is a photo conductor cell. It will be understood by one skilled in the art that the registration light source can be placed on the drum and the photo conductive device placed under the table. Another known registration technique is to attach a linear encoder to the table, and then by electrical means (such as a phase-locked loop) synchronize the movements of drum and table.

Alternatively, the photosensitive material can be mounted in an internal drum system, an external drum system, or any other suitable holder for retaining and moving the material synchronously with the drum 28.

Compensation for the curvature of the drum can be provided by the optics selected, as known, such as Holographic Optical Elements or a computer generated lens. In this way, distortion of the image due to the curvature of the drum can be prevented.

It is a particular feature of the present invention that, after the image has been created on the optical memory by the write-or-read head, the system can reexpose photosensitive materials with no electrical writing. Since the memory is optical, there is no trade-off between the resolution and imaging time. Using certain optical memories, the system can expose different materials time after time. With these memories, the image remains on the drum until it is written over by a new image. Using other optical memories, the image remains on the drum only long enough for exposure of the photosensitive material, and is then "forgotten" or erased.

Figure 6:
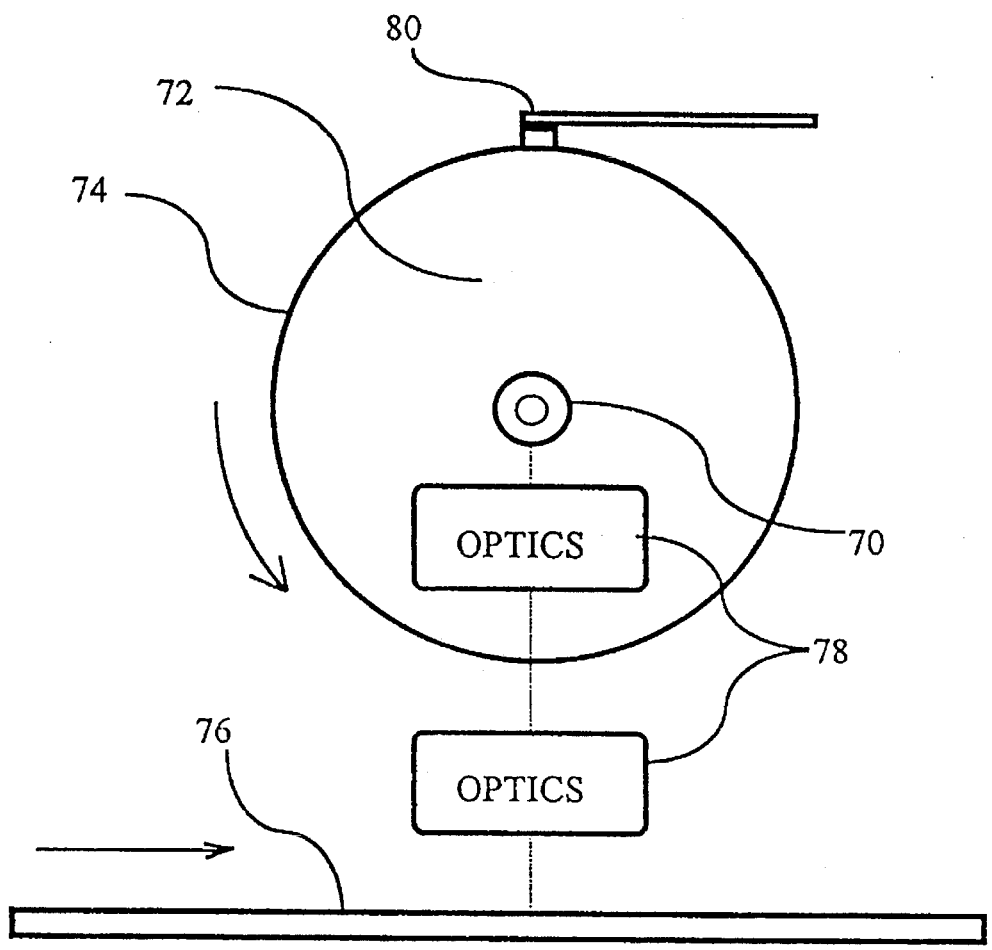
FIG. 6 is a schematic illustration of an image processing system according to another embodiment of the present invention.

Referring now to FIG. 6, there is shown schematically an image processing system according to an alternate embodiment of the invention. In this embodiment, the light source 70 is disposed inside a transparent drum 72 defining optical memory means 74 around its outer surface. The photosensitive material 76 is mounted on a flatbed or drum arranged for synchronous movement with drum 72. The required optics 78 may be provided inside and/or outside of drum 72. Read/write heads 80 are provided for writing and reading on optical memory 74. Operation of this embodiment is substantially the same as described above with reference to FIG. 1.

Figure 4:
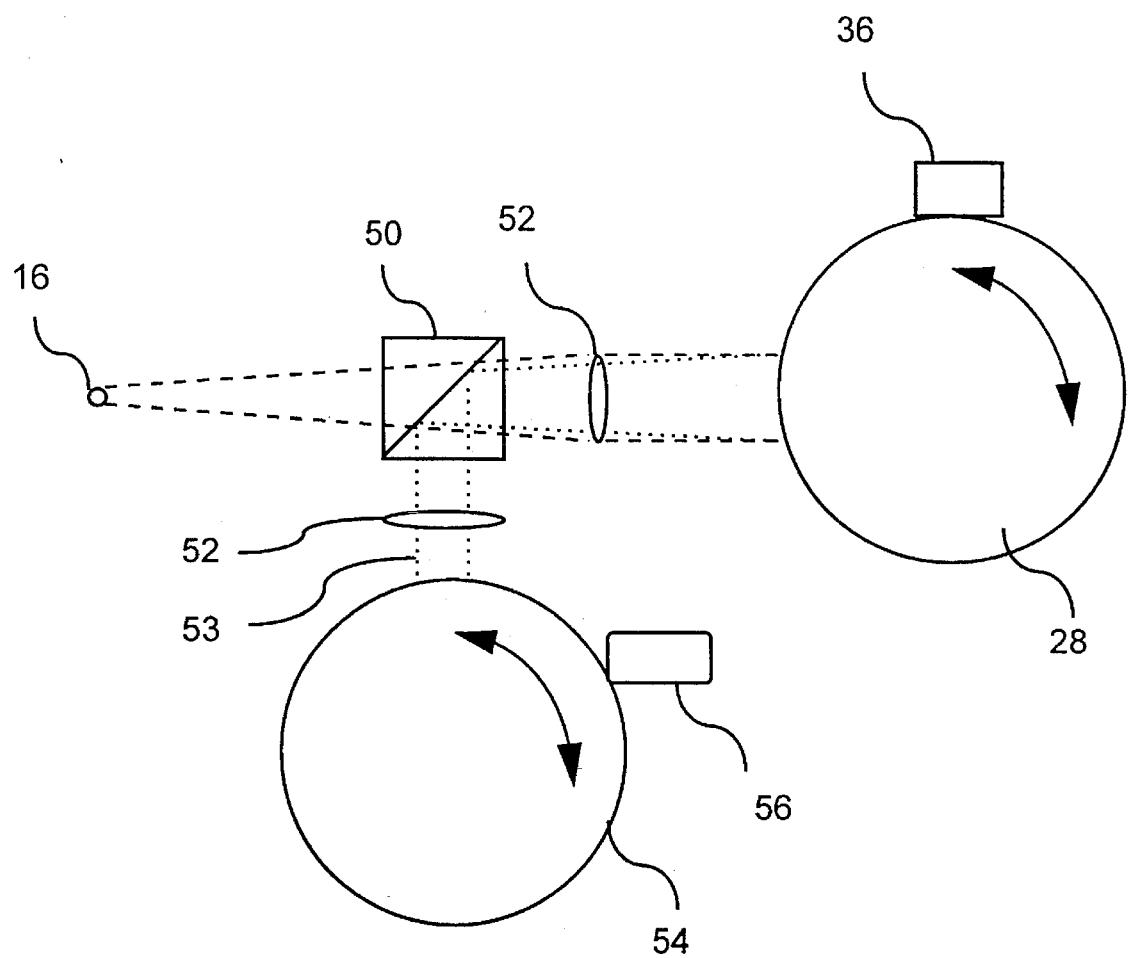
FIG. 4 is a schematic side view of a printing machine according to the invention.

The modulating rotating drum of the invention can be utilized as a component in any kind of image processing system. For example, a Xerographic drum can constitute the photosensitive material, thus creating a high-speed combination photocopying, printing and scanning machine. Such a machine is illustrated schematically in FIG. 4 in which the light source 16 sends light beams to the rotatable drum 28 through various optical devices 50 & 52. The exposing light 53 impinges on a Xerographic drum 54 which afterwards transfers the image to a sheet of paper using toner 56. Alternatively the exposing system can be composed of three drums, each for a different color, thereby creating a color photocopy machine which can store and process color pictures.

Figure 5:
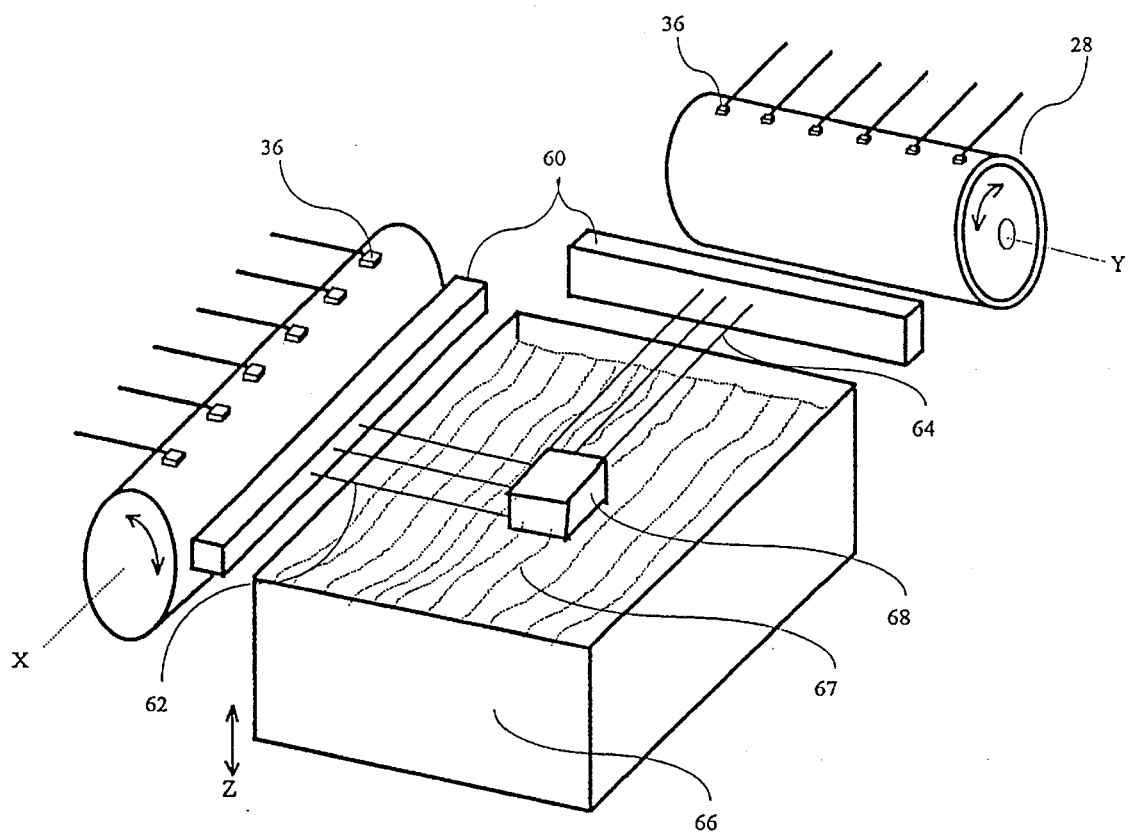
FIG. 5 is a schematic perspective view of a rapid prototype machine according to the invention.

The image processing system of the invention is not restricted to two dimensional images. Rather, it is possible to expose in three dimensions using at least one drum according to the invention. Such a system can create a 3D prototype, for example, by exposing a photosensitive liquid polymer inside a container. One such 3D rapid prototyping machine is illustrated schematically in FIG. 5. This embodiment is a two drum system, one each for the X and Y axis. The Z axis is common and moves continuously in place of the flatbed.

Two rotating drums 28, disposed perpendicular to one another, send exposing light 62, 64 by appropriate optical devices 60.through the transparent sides of a container 66 containing a photosensitive liquid polymer 67. The container 66 is capable of moving up and down along the Z axis. A solid polymer structure 68 is formed in the container at the intersection of the light beams from the two drums.

The preceeding examples serve merely to illustrate the invention and are not to be construed as limiting the invention in any way. Rather, the invention is defined solely by the following claims.

I claim:

1. An image processing device including a raster image processor, said device comprising:
   a rotatable drum defining an optical memory on its outer surface;
   said optical memory being characterised in that:
   it constitutes the active read/write memory of said raster image processor for a digital image written thereon; and
   it modulates light illuminating said optical memory from a light source during imaging.

2. An image processing system comprising:
   at least one rotatable drum defining a light modulating optical memory on its outer surface; said optical memory being characterized in that it constitutes the active read/write memory of a raster image processor for a digital image written thereon, and it modulates light illuminating said optical memory from a light source during imaging;
   at least one read/write head arranged to receive digital data corresponding to an image and to write said received digital data on said optical memory;
   a light source arranged to illuminate said optical memory;
   holder means for holding photosensitive material, said holder means being arranged for synchronous movement with said drum; and
   means for imaging the image from said optical memory onto photosensitive material in said holder.

3. A system according to claim 2 wherein:
   said at least one read/write head comprises a plurality of read/write heads;
   said system further comprises:
   a computer serving as a system controller;
   a plurality of low-power CPU's coupled to said computer and arranged to receive image data relating to a portion of said image;
   means for moving said read/write heads longitudinally along the axis of said drum;
   each of said read/write heads being coupled to one of said low-power CPU's and arranged to write data received therefrom on said drum.

4. A system according to claim 2 and wherein said light source comprises a large area light source.

5. A device according to claim 1 wherein said optical memory comprises a magneto-optical coating.

6. A device according to claim 1 wherein said optical memory comprises an electro-optical coating.

7. A device according to claim 1 wherein said optical memory comprises a liquid crystal layer.

8. A system according to claim 2 wherein said optical memory comprises a magneto-optical coating.

9. A system according to claim 2 and wherein said optical memory comprises an electro-optical coating.

10. A system according to claim 2 and wherein said optical memory comprises a liquid crystal layer.

11. An image processing system according to claim 2 comprising:
    at least one rotatable drum defining a light modulating optical memory on its outer surface; and wherein
    said photosensitive material includes photosensitive polymer material mounted in said holder means for creating a three-dimensional image.

12. An image processing system according to claim 3 comprising:
    at least one rotatable drum defining a light modulating optical memory on its outer surface; and wherein
    said photosensitive material includes photosensitive polymer material mounted in said holder means for creating a three-dimensional image.

13. An image processing system including a raster image processor, said system comprising:
    (a) at least one rotatable drum defining a light modulating optical memory on its outer surface according to claim 1;
    said optical memory being characterized in that:
    it constitutes the active read/write memory of said raster image processor for a digital image written thereon; and
    it modulates light illuminating said optical memory from a light source during imaging;
    (b) at least one read/write head arranged to receive data corresponding to an image and to write said received data on said optical memory;
    (c) a light source arranged to illuminate said optical memory;
    (d) holder means for holding photosensitive material, said holder means being arranged for synchronous movement with said drums; and
    (e) means for imaging the image from said optical memory onto photosensitive material in said holder; and wherein:
    said at least one read/write head comprises a plurality of read/write heads;
    said system further comprises:
    a computer serving as a system controller;
    a plurality of low-power CPU's coupled to said computer and arranged to receive image data relating to a portion of said image;
    means for moving said read/write heads longitudinally along the axis of said drum;
    each of said read/write heads being coupled to one of said low-power CPU's and arranged to write data received therefrom on said drum; and
    said at least one drum comprises two rotatable drums, each defining a light modulating optical memory on its outer surface, said drums being mounted perpendicular to one another; and said photosensitive polymer material is disposed so as to be exposed simultaneously by said perpendicularly mounted drums.

14. An image processing system according to claim 2 wherein said holder means and photosensitive material constitute a xerographic drum for high speed printing.

15. An image processing system according to claim 3 wherein said holder means and photosensitive material constitute a xerographic drum for high speed printing.

16. An image processing system according to claim 2 and further comprising optical compensation means for compensating for the curvature of said drum to prevent distortion of the image due to said curvature.

17. An image processing system according to claim 3 and further comprising optical compensation means for compensating for the curvature of said drum to prevent distortion of the image due to said curvature.

18. An image processing system according to claim 11 and further comprising optical compensation means for compensating for the curvature of said drum to prevent distortion of the image due to said curvature.

19. An image processing system according to claim 14 and further comprising optical compensation means for compensating for the curvature of said drum to prevent distortion of the image due to said curvature.

20. A method for processing images comprising:
   1) recording, in a digital optical memory disposed on a rotatable drum, digital data corresponding to an image; and
   2) exposing a photosensitive material to the image on the optical memory at a rate which is synchronized with rotation of the drum, by modulating light by means of said optical memory onto relatively large portions of the material being exposed at a time.

* * * * *